United States Patent [19]
Hieda et al.

[11] Patent Number: 5,585,844
[45] Date of Patent: Dec. 17, 1996

[54] IMAGE SENSING APPARATUS HAVING COMMON CIRCUITRY FOR PROCESSING DIGITAL ADJUSTMENT SIGNALS

[75] Inventors: Teruo Hieda; Shinji Sakai, both of Yokohama; Makoto Shimokoriyama, Kawasaki; Tsutomu Fukatsu, Yokohama, all of Japan

[73] Assignee: Canon Kabushiki Kaisha, Tokyo, Japan

[21] Appl. No.: 409,953

[22] Filed: Mar. 23, 1995

Related U.S. Application Data

[63] Continuation of Ser. No. 842,083, Feb. 26, 1992, abandoned.

[30] Foreign Application Priority Data

Feb. 27, 1991 [JP] Japan ................................. 3-032902

[51] Int. Cl.⁶ .................................................. H04N 9/73
[52] U.S. Cl. ......................... 348/224; 348/223; 348/229
[58] Field of Search .................................. 348/224, 223, 348/229; 358/908, 909.1; H04N 9/73, 9/09, 9/07

[56] References Cited

U.S. PATENT DOCUMENTS

| | | |
|---|---|---|
| 4,782,394 | 11/1988 | Hieda . |
| 4,805,010 | 2/1989 | Shroyer et al. ..................... 348/227 |
| 4,814,861 | 3/1989 | Hieda . |
| 4,827,349 | 5/1989 | Ogata et al. ......................... 358/443 |
| 4,860,092 | 8/1989 | Hieda . |
| 4,901,152 | 2/1990 | Hieda et al. . |
| 5,027,214 | 6/1991 | Fujimori ............................. 358/209 |
| 5,034,804 | 7/1991 | Sasaki et al. ........................ 358/47 |
| 5,043,816 | 8/1991 | Nakano et al. ..................... 358/209 |
| 5,093,716 | 3/1992 | Kondo et al. ...................... 358/29 C |
| 5,185,659 | 2/1993 | Itagaki et al. . |
| 5,319,449 | 6/1994 | Saito et al. ......................... 348/227 |
| 5,345,264 | 9/1994 | Murata et al. ..................... 348/223 |

FOREIGN PATENT DOCUMENTS

| | | |
|---|---|---|
| 0356123 | 2/1990 | European Pat. Off. . |
| 0400606 | 12/1990 | European Pat. Off. ......... H04N 9/73 |
| 0446647 | 9/1991 | European Pat. Off. . |
| 605240A2 | 6/1994 | European Pat. Off. . |
| 3320690 | 12/1983 | Germany . |

*Primary Examiner*—Kim Yen Vu
*Attorney, Agent, or Firm*—Fitzpatrick, Cella, Harper & Scinto

[57] ABSTRACT

An image sensing apparatus includes: a signal processing circuit for processing image sensing signals; a plurality of adjustment signal generating circuits for generating mutually different output signals for automatic adjustment by using part of the signals of the signal processing circuit; an interface for receiving the output of the plurality of adjustment signal generating circuits and outputting it through a common signal path. Also included is a control microprocessor for adjusting a plurality of adjusting sections of the image sensing apparatus by using the output of the plurality of adjustment signal generating circuits output through the common signal path, wherein adjustment of the plurality of adjusting sections of the image sensing apparatus using the output of the plurality of adjustment signal generating circuits is effected with a reduced number of signal paths between the plurality of adjustment signal generating circuits and the control microprocessor, thereby simplifying the circuit construction of the image sensing apparatus as a whole and improving the reliability thereof.

17 Claims, 17 Drawing Sheets

FIG. 16
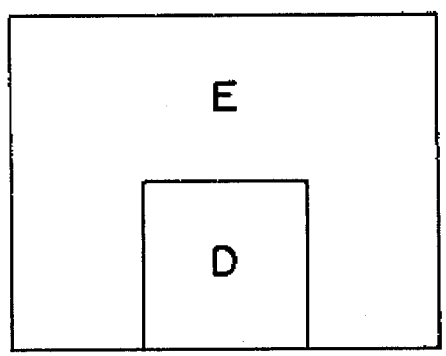
FIG. 17
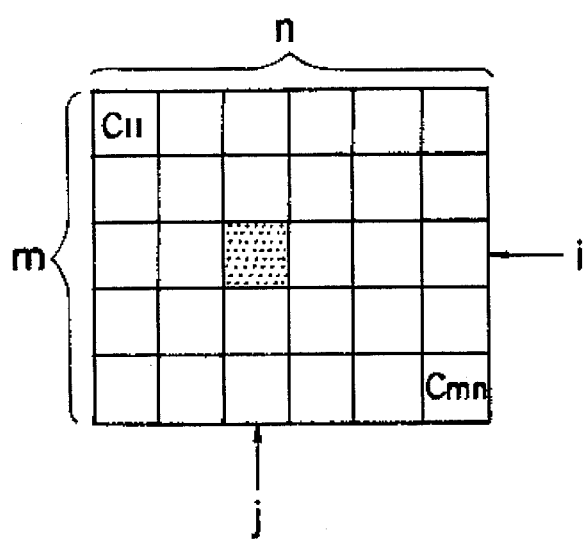
 DENOTE $C_{ij}$

FIG. 20
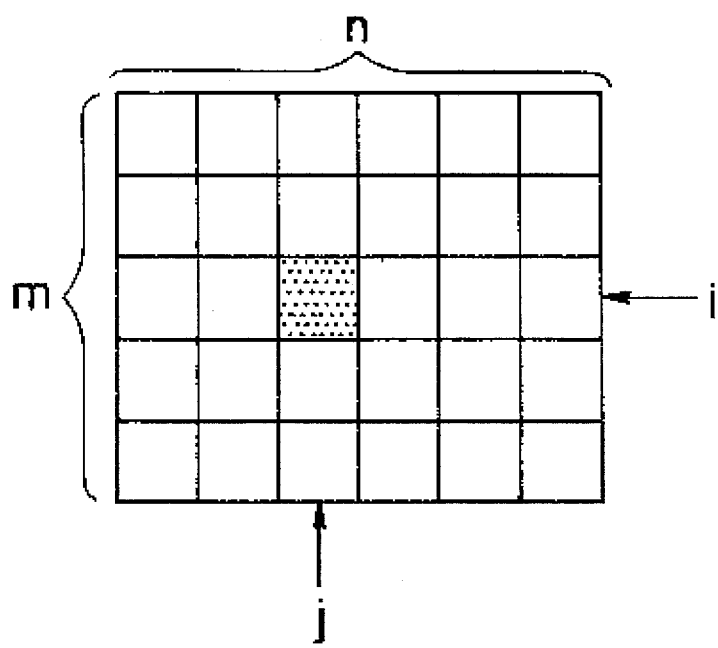
 DENOTE $(R-Y)_{ij}$ AND $(B-Y)_{ij}$

IMAGE SENSING APPARATUS HAVING COMMON CIRCUITRY FOR PROCESSING DIGITAL ADJUSTMENT SIGNALS

This application is a continuation of application Ser. No. 07/842,083 filed Feb. 26, 1992, now abandoned.

BACKGROUND OF THE INVENTION

1. Field of the Invention

The present invention relates to an image sensing apparatus and, in particular, to an image sensing apparatus which is suitable for circuit integration resulting from the digitization of signal processing operations in such an image sensing apparatus.

2. Related Background Art

There have been remarkable developments in the field of image sensing apparatuses, such as video cameras. The performance of such apparatuses has been improved and enhanced in various ways, for example, by equipping them with a number of functions. Further, a digital signal processing operation has recently been introduced into this field.

In this regard, an image sensing apparatus has already been proposed in which an output from an image sensing device, such as a two-dimensional CCD having minute color separation filters arranged over the entire surface thereof, is digitized by means of an AD converter, and subjected to a signal processing operation by a signal processing circuit using a digital processing technique, thereby obtaining television signals.

Further, integration of such image sensing apparatuses has been considered.

In the prior-art technique described above, however, the circuits for automatically effecting the focusing, exposure adjustment, white balance adjustment, etc. of the image sensing apparatus are controlled separately through different signal paths by means of a microcomputer, with the result that the construction of the image sensing apparatus as a whole is rather complicated. Further, in the prior-art technique, the number of IC chips used is rather large and, moreover, it is hard to integrate these IC chips. These factors have been a barrier to reducing the size of the image sensing apparatus as a whole. In such an image sensing apparatus, the digital signal processing is separately performed in different sections of the apparatus. Thus, it has been impossible to realize a digital integrated circuit for video cameras which is capable of synthesizing the performance of signal processing operations in a digital video camera.

SUMMARY OF THE INVENTION

The present invention has been made with a view toward solving the problems mentioned above. It is a first object of the present invention to provide an image sensing apparatus in which a plurality of signal processing operations in the apparatus are simplified, and in which the number of signal paths is substantially reduced, thereby simplifying the construction of the control system and improving the reliability of the image sensing apparatus.

A second object of the present invention is to provide an image sensing apparatus in which an adjustment on adjusting sections related to an image sensing operation using the output of various adjustment signal generating means in the image sensing apparatus can be performed with substantially simplified signal paths between the adjustment signal generating means and the control means.

To achieve these objects, there is disclosed in accordance with a preferred embodiment of the present invention, an image sensing apparatus comprising:

signal processing means for processing image sensing signals;

a plurality of adjustment signal generating means for generating mutually different signals for automatic adjustment by using part of the signals of the signal processing means;

interface means for inputting the output of the plurality of adjustment signal generating means and outputting it through a common signal path; and control means for adjusting a plurality of adjusting sections of the image sensing apparatus by using the output of the plurality of adjustment signal generating means output through the common signal path.

A third object of the present invention is to provide an image sensing apparatus in which the signal paths between the control means and a plurality of signal processing blocks for performing various signal processing operations of the image sensing apparatus and the signal processing operations are simplified, thereby making it possible to realize a one-chip-type control circuit for controlling an image sensing operation.

A fourth object of the present invention is to provide an image sensing apparatus in which it is possible to use a semiconductor device of a small mounting area having a substantially reduced number of output terminals, thereby improving the reliability of the image sensing apparatus.

A fifth object of the present invention is to provide an image sensing apparatus in which adjustment of a plurality of adjusting sections of an image sensing apparatus by means of the output of the plurality of adjustment signal generating circuits can be performed with substantially reduced signal paths between a plurality of adjustment signal generating circuits and a control microprocessor, thereby simplifying the circuit construction of the image sensing apparatus as a whole and improving the reliability thereof.

To achieve these objects, there is disclosed in accordance with a preferred embodiment of the present invention, an image sensing apparatus comprising the following components which are integrated on a common semiconductor:

signal processing means for processing image sensing signals;

a plurality of adjustment signal generating means for generating mutually different signals for automatic adjustment by utilizing part of the signals of the signal processing means; and interface means for inputting the output of the plurality of adjustment signal generating means and outputting it through a common signal path.

A sixth object of the present invention is to provide an image sensing apparatus in which various adjusting circuits of the image sensing apparatus are adapted to perform digital signal processing operations, and in which the control system for these signal processing circuits is simplified, thereby realizing a one-chip microprocessor for image sensing apparatuses.

A seventh object of the present invention is to provide a digital signal processing circuit IC for video cameras in which digital signal processing circuit blocks for automatic focusing, white balance adjustment, and automatic iris adjustment are realized in a one-chip structure.

An eighth object of the present invention is to provide a digital signal processing circuit interface for video cameras in which interface blocks for outputting parameters for performing adjustments regarding an image sensing operation, such as automatic focusing, white balance adjustment and automatic iris adjustment to a common arithmetic circuit are realized in a one-chip structure.

Other objects and features of the present invention will become apparent from the following embodiments and drawings.

BRIEF DESCRIPTION OF THE DRAWINGS

FIG. 11 is a flowchart illustrating the operation of an MPU in the embodiment of FIG. 10 when power is turned on;

FIG. 16 is a diagram illustrating counter-light detecting operations in steps 640 to 642 of the operation flowcharts of FIGS. 14 and 15;

FIG. 17 is a diagram illustrating a frame C for AE control in FIG. 12;

FIG. 20 is a diagram illustrating an AWB frame in FIG. 19.

DETAILED DESCRIPTION OF THE PREFERRED EMBODIMENTS

[First Embodiment]

Figure 1:
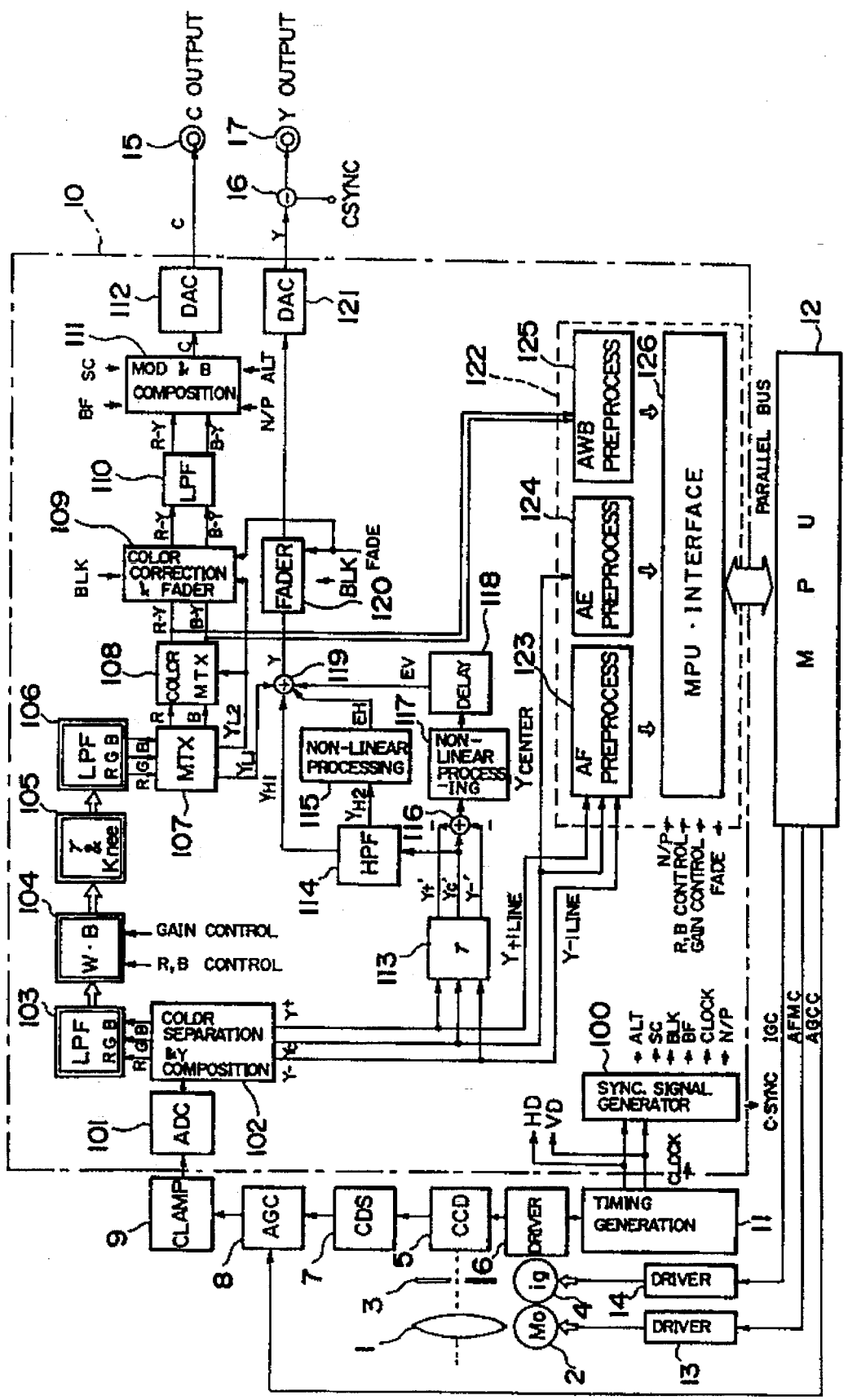
FIG. 1 is diagram showing an embodiment of the present invention.

FIG. 1 is a block diagram illustrating an embodiment of the present invention.

Numeral 1 indicates an image sensing lens; numeral 2 indicates an automatic focusing (AF) motor for rotating a focus ring of the image sensing lens 1; numeral 3 indicates a diaphragm; numeral 4 indicates an IG meter for controlling the aperture of the diaphragm 3; and numeral 5 indicates a two-dimensional color image sensing device including minute color separating filters (hereinafter referred to as "CCD"). However, the image sensing device of the present invention is not restricted to CCD; it is also possible to employ an image pickup tube or an X-Y address sensor. Numeral 6 indicates a CCD driver for driving the CCD 5; numeral 7 indicates a correlative double sampling circuit (CDS) for removing clocks and reset noise from the photoelectric conversion output of the CCD 5; numeral 8 indicates an automatic gain control amplifier (AGC) for amplifying the output of the CDS 7 in accordance with a control signal AGCC; numeral 9 indicates a clamp circuit for fixing the black level of an input voltage to a fixed voltage; numeral 10 indicates an integrated circuit for performing signal processing operations on the output signals of the CCD supplied thereto to form predetermined color video signals; numeral 12 indicates a microprocessor unit (MPU) which receives digital data on the signals supplied from the integrated circuit 10, controls the integrated circuit 10 and, further, generates signals for controlling the AF motor 2, the IG meter 4, and the AGC 8; numeral 13 indicates an AF driver circuit for driving the AF motor 2; numeral 14 indicates an IG driver circuit for driving the IG meter 4; numeral 15 indicates a chrominance signal (C) output terminal; and numeral 16 indicates a luminance signal (Y) output terminal.

Numerals 100 to 126 indicate inner circuit components of the integrated circuit 10, of which numeral 100 indicates a synchronization signal generator which generates a blanking pulse BLK, a burst flag pulse BF, a color sub-carrier SC, a line sequential signal ALT, a composite synchronization signal CSYNC, etc. for the generation of standard television signals, in response to a clock pulse, a horizontal synchronization pulse HD and a vertical synchronization pulse VD which are supplied from a timing generation circuit 11, an NTSC and a PAL switching signal N/P which are supplied from the MPU 12, and clock pulses of different frequencies needed for the interior of the integrated circuit 10.

Numeral 101 indicates an AD converter for generating digital signals in accordance with input signals. The circuits from this AD converter onward treat digital signals. Numeral 102 indicates a color-separation/luminance signal-synthesis circuit which includes two delay lines of one horizontal line, a matrix circuit and a switching circuit and which is adapted to separate color signal components R, G and B from input signals and to synthesize a luminance signal Yc, and further, to synthesize luminance signals Y− and Y+ which are vertically shifted by one line upwardly and downwardly from Yc. Numeral 103 indicates a low-pass filter for effecting band restriction and time-division sampling; and numeral 104 indicates a white balance (WB) circuit for varying the gains of time-divided color channels.

Numeral 105 indicates a gamma & Knee circuit for performing gamma correction and level compression of high-luminance components; numeral 106 indicates a low-pass filter which receives time-division signals to convert them to continuous parallel signals of three channels (R, G and B) and which further effects band restriction; numeral 107 indicates a matrix circuit which synthesizes low-band luminance signals YL1 and YL2 from R, G and B; numeral 108 indicates a color difference matrix circuit for generating signals R−Y and B−Y from R, B and YL2; numeral 109 indicates a color correction circuit for performing gain control over the color-difference signals and which includes a color correction matrix; numeral 110 indicates a low-pass filter; and numeral 111 indicates a modulation circuit which adds up the color-difference signals after modulating them by a color sub-carrier (SC) and which further adds a color burst signal.

Numerals 112 and 121 indicate DA converters for converting digital signals to analog signals; numeral 113 indicates a gamma-correction circuit for performing gamma correction on the three luminance signals input; numeral 114 indicates a high-pass filter which only passes predetermined high-luminance components of the luminance signals; numeral 115 and 117 indicates non-linear processing circuits which compress those input signals which are around the zero level; numeral 118 indicates a delay line for effecting delay corresponding to the delay time of the high-pass filter 114; numeral 119 indicates an adder; and numeral 120 indicates a fader for changing the gains of the luminance signals and performing blanking processing.

Numeral 122 indicates a preprocessing section which performs processing such that the delivery of data to and from the MPU and the processing by the MPU are facilitated when the MPU reads those signals of the different sections of the integrated circuit 10 which are necessary for control operations, such as automatic focusing (AF), automatic exposure control (AE) and automatic white balance control (AWB). The circuits indicated by numerals 123 to 126 are provided in the preprocessing section 122. An AF preprocessing circuit 123 performs preprocessing of AF; an AE preprocessing circuit 124 performs preprocessing of AE; an AWB preprocessing circuit 125 performs preprocessing of AWB; and an MPU interface circuit 126 delivers the output of these preprocessing circuits to the MPU 12, and receives control data on the different sections of the integrated circuit 10 supplied from the MPU 12.

Next, the operation of the above embodiment will be described. An image of a subject (not shown) is adjusted in terms of quantity of light by the image sensing lens 1 and diaphragm 3, and is transmitted through the above-mentioned minute color separation filters of the CCD 5 to undergo color separation. Then, the image is formed on the photoelectric conversion surface of the CCD to undergo photoelectric conversion pixel by pixel, and output sequentially as image sensing signals in response to the driving pulses of the driver circuit 6. First, the clock components and reset noise are removed from these image sensing signals by the CDS circuit 7, and the signals are amplified by the AGC circuit 8 in accordance with the gains corresponding to the AGCC signals. The black level is fixed to a reference voltage which is substantially at the lower limit of the input range of the ADC circuit 101, and the signals are converted to digital signals by the AD converter 101 in the integrated circuit 10.

These digital signals are first separated into color components of R, G and B by the color separation/Y-synthesis circuit 102. At the same time, the luminance signal YC is synthesized along with the luminance signal Y−, which is one horizontal line above (before) this luminance signal, and the luminance signal Y+, which is one horizontal line below (after) this luminance signal. These R, G and B signals are restricted to a fixed band by the low-pass filter 103, and then three-phase-converted to time-division signals to become one-channel signals. In the WB circuit 104, these signals are amplified in accordance with fixed gains set by the MPU 12. In this process, white balance adjustment is effected by changing only the gains of the R and B signals, and, by simultaneously varying the gains of the R, G and B signals, an overall gain control can be effected.

This output is subjected to gamma correction and high-luminance-component compression by the gamma & Knee circuit 105, and is restored to the R, G and B signals by the low-pass filter 106. After being restricted to a fixed band, the R, G and B color signals are added up at a fixed ratio by the matrix circuit 107 to form low-pass luminance signals YL1 and YL2. As stated below, YL1 is subjected to re-sampling at the same sampling rate as a high-pass luminance signal so as to form a high-pass luminance signal. YL2 is not subjected to re-sampling since it is only used for the formation of color difference signals.

Subtraction is performed on the YL2, R and B at a fixed ratio by the color difference matrix circuit 108 to form color difference signals R-Y and B-Y. These color difference signals are subjected to gain control, predetermined matrix computation and color correction by the color-correction/fader circuit 109. Further, when the MPU 12 designates a fading operation, a gradual gain variation is effected. This output is subjected to re-sampling by the low-pass filter 110 at a sampling rate needed for color modulation, for example, four times the frequency of the color sub-carrier SC, restricted to a fixed band, and modulated at the modulation circuit 111 by the color sub-carrier SC, with a burst signal being superimposed in accordance with a burst flag signal BF. If, at this time, the N/P signal designates PAL, the burst signal and chrominance signal are inverted in a fixed phase in accordance with the ALT signal so as to be adapted to the PAL standard.

This output is digital-analog converted by the DA converter 112 and output from a C-output terminal 15 as a chrominance signal to be supplied to a VTR, television monitor or the like (not shown).

The luminance signals Yc, Y− and Y+, output from the color-separation/Y-synthesis circuit 102, are subjected to gamma correction by the gamma correction circuit 113 to form, first, high-pass luminance signals YH1 and YH2 by means of the high-pass filter 114. Here, it is assumed that the signal YH1 is beyond the band of the low-pass luminance signal YL1 for generating the above-mentioned luminance signal, and that the range of the signal YH2 is 3 to 4 MHz or more, etc.

The signal YH2 is converted by the non-linear processing circuit 115 to a horizontal contour emphasis signal EH which has undergone compression around the zero level. The output of the gamma correction circuit 113 is subjected to addition and subtraction by the adder 116 and is likewise subjected to compression around the zero level by the non-linear processing circuit 117, and delayed by the delay circuit 118 to become a vertical contour emphasis signal EV. The signals YL1, YH1, EH and EV are added up by the adder 119 to form a luminance signal Y, which is subjected to blanking processing by the fader 120, and, as in the above case, a gradual gain variation is effected at the time of the fading operation.

The output signal is digital-analog converted by the DA converter 121 and added to the composite synchronization signal CSYNC by the adder 16, and is output from a Y-output terminal 17 to be supplied, as in the above-described case, to a VTR, television monitor or the like (not shown).

The signals Yc, Y− and Y+ are processed by the AF preprocessing circuit 123 to form requisite data for AF, and the signal Yc is processed by the AE preprocessing circuit 124 to form requisite data for AE. Further, the output signals R-Y and B-Y from the above-described color difference matrix circuit 108 are processed by the AWB preprocessing circuit 125 to form requisite data for AWB. These items of data are read by the MPU circuit 12 through the MPU interface circuit 126.

Figure 2:
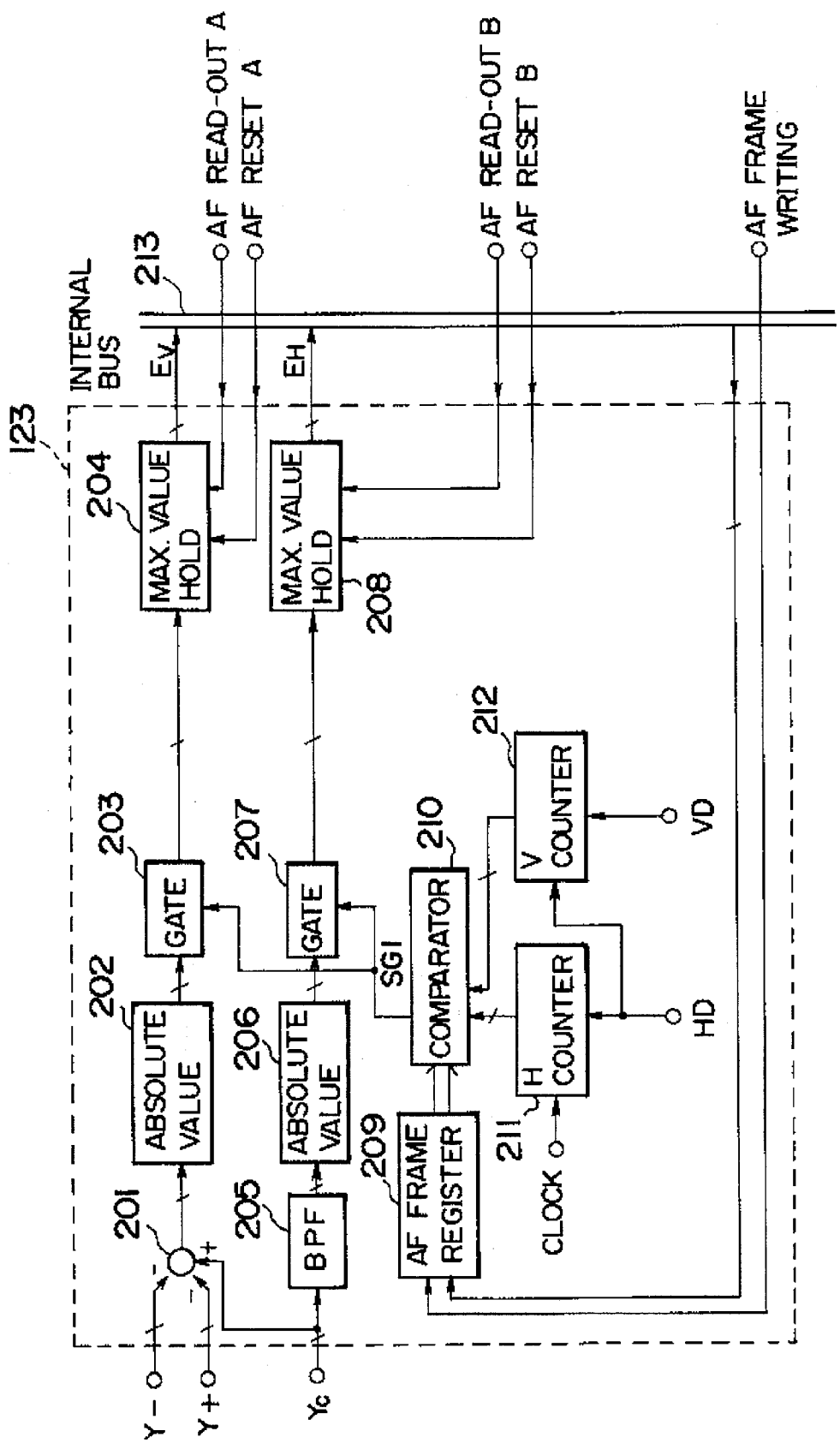
FIG. 2 is a detailed diagram illustrating an AF preprocessing in the embodiment of FIG. 1.

FIG. 2 shows in detail the AF preprocessing circuit 123 of FIG. 1. Numeral 201 indicates an adder; numerals 202 and 206 indicate absolute value circuits for obtaining the absolute values of input signals; numerals 203 and 207 indicate gate circuits for gating input signals in accordance with a gate signal SG1; numerals 204 and 208 indicate maximum value hold circuits for holding the maximum values of input signals; numeral 205 indicates a band pass filter; numeral 209 indicates an AF frame register for retaining the position and size of an AF frame on an image plane; numeral 210 indicates a comparator; numeral 211 indicates an H counter which is reset by a horizontal synchronization signal HD to count clocks; numeral 212 indicates a V counter which is reset by a vertical synchronization signal VD to count HD; and numeral 213 indicates an internal bus for connecting the AF preprocess circuit 123, the AE preprocess circuit 124 and the AWB preprocess circuit 125 to the MPU interface circuit 126.

First, the H counter 211 and the V counter 212 generate a signal corresponding to the present scanning position of an image sensing signal in the image plane, and the signal is compared by the comparator 210 with frame data previously written to the AF frame register 209 to generate a frame signal SG1 representing the AF frame, i.e., the extraction range of the image sensing signal for AF.

A high-frequency-band component ranging, e.g., from 1 to 3 MHz, which is required for AF, is extracted from the input luminance signal Yc by the band pass filter 205, and the absolute value thereof is obtained by the absolute value circuit 206 to be gated by the gate circuit 207 in accordance with the above-mentioned gate signal SG1 within the range corresponding to the above-mentioned AF frame, the maximum value hold circuit 208 holding the maximum value EH of the high-frequency component in the horizontal direction in the above AF frame.

In this process, an AF reset signal B is generated, for example, during vertical blanking interval, by the MPU interface circuit 126, thereby resetting the maximum value hold circuit 208. Afterwards, the maximum value EH held by the maximum value hold circuit 208 is output to the internal bus 213 due to the generation of an AF read signal B at the beginning of the next vertical blanking interval.

Further, in the adder 201, addition and subtraction are performed on the luminance signals Yc, Y– and Y+, to obtain a high-pass component in the vertical direction, which is converted to an absolute value by the absolute value circuit 202, and gated by the gate circuit 203 in accordance with the above-mentioned gate signal SG1, and the maximum value EV of the high-frequency component in the vertical direction within the AF frame is held by the maximum value hold circuit 204.

As in the case of the maximum value hold circuit 208, the operations of resetting and reading out to the internal bus 213 of the data being held are performed in accordance with an AF reset signal A and an AF read-out signal A, respectively.

Figure 13:
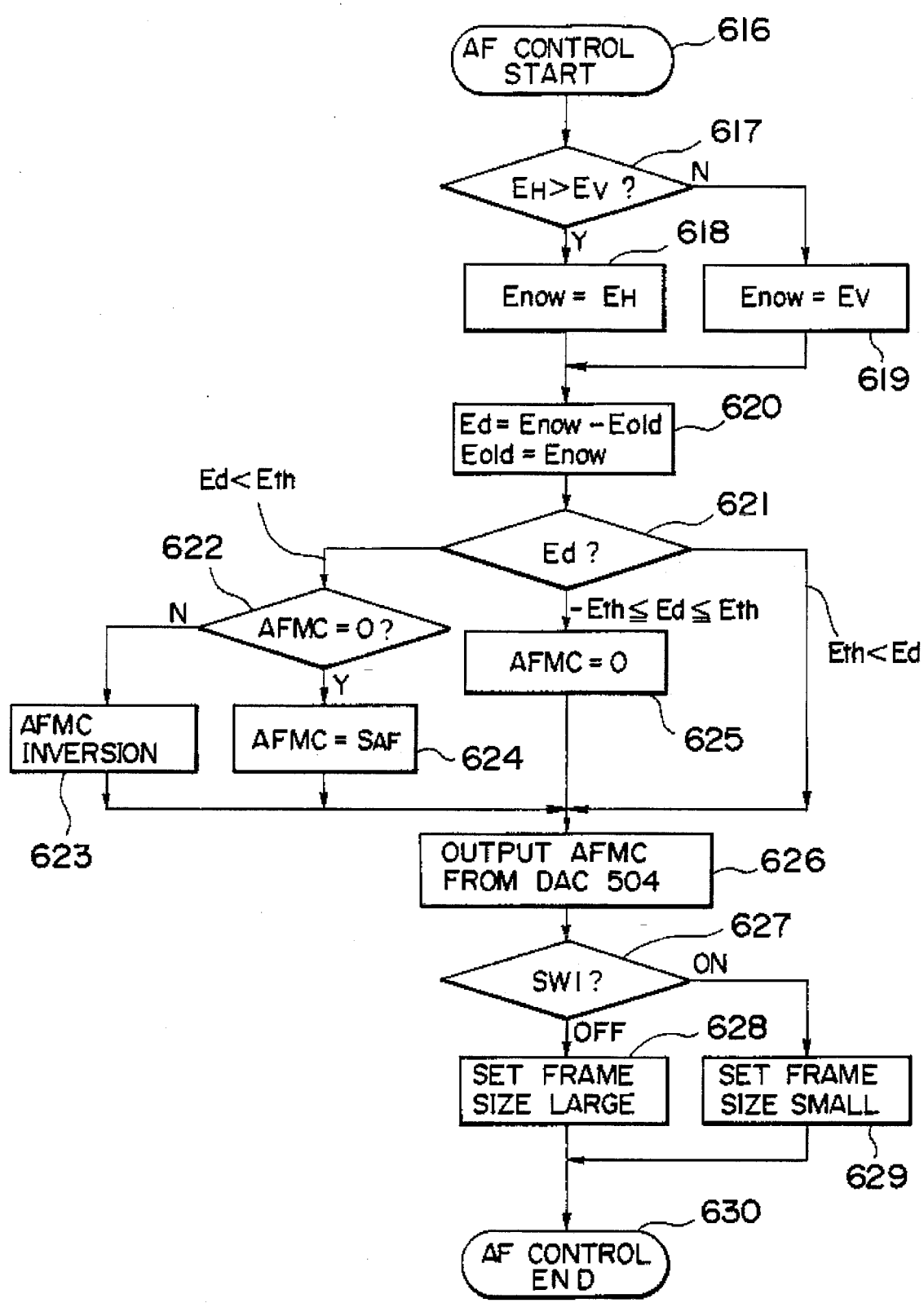
FIG. 13 is a diagram illustrating an operation of AF control in step 612 of the operation flowchart of FIG. 12.

The maximum values in the horizontal and vertical directions of the high-frequency component thus read out are used in AF control in accordance with the algorithm shown in FIG. 13.

Figure 3:
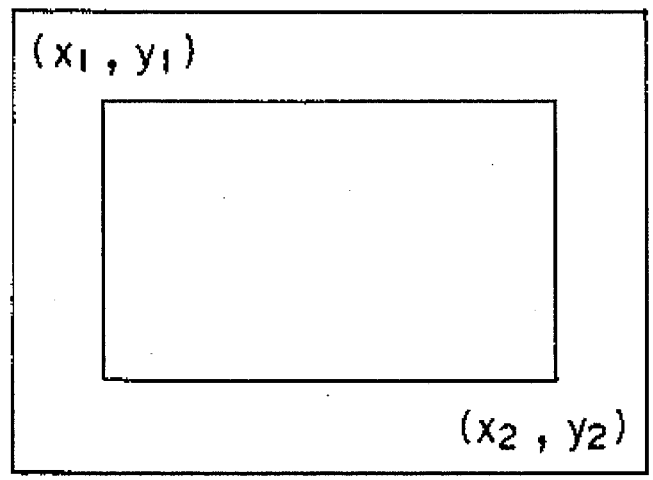
FIG. 3 is a diagram illustrating the case where the AF frame of FIG. 2 is enlarged.
Figure 4:
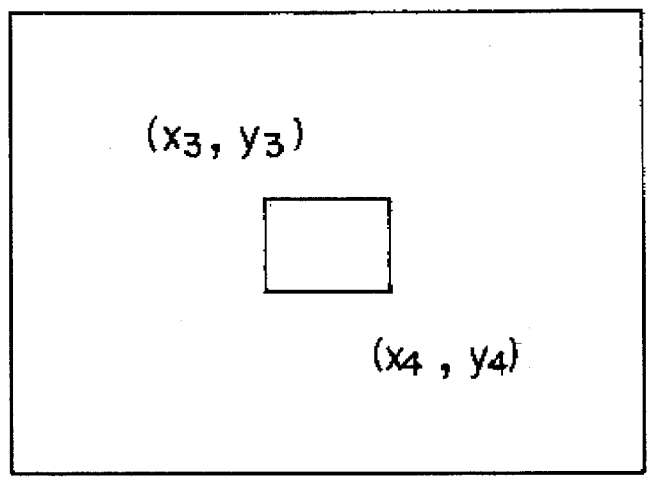
FIG. 4 is a diagram illustrating the case where the AF frame of FIG. 2 is reduced.

FIGS. 3 and 4 illustrate the AF frame of FIG. 2. In the drawings, the outer frame represents an image plane, and the inner frame represents the AF frame. When, for example, coordinate values x1, y1, x2 and y2 are written to the AF register 209 in the manner shown in FIG. 3, the AF frame obtained is relatively large with respect to the image plane, and when coordinate values x3, y3, x4 and y4 are written in the manner shown in FIG. 4, the AF frame obtained is relatively small with respect to the image plane. Switching between the two manners of writing is effected by a switch SW1 of FIG. 10 described below. The pattern of the AF frame is not restricted to that of this embodiment. Further, it is also possible for a plurality of AF frames to exist simultaneously.

Figure 5:
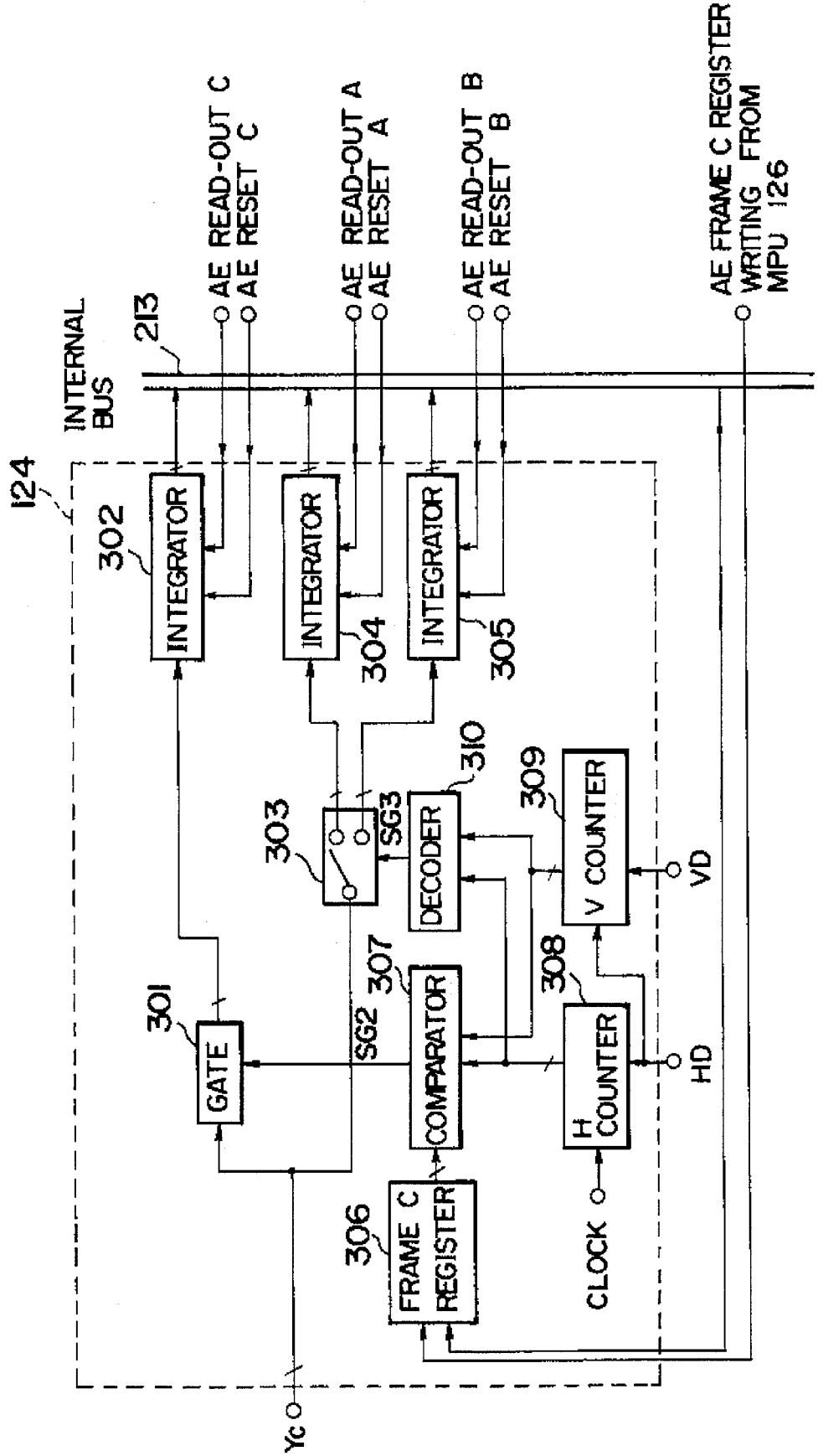
FIG. 5 is a detailed diagram illustrating an AE preprocessing in the embodiment of FIG. 1.

FIG. 5 shows in detail the AE preprocess circuit 124 of FIG. 1. Numeral 301 indicates a gate circuit for setting an AE frame in the image plane; numerals 302, 304 and 305 indicate integrators; numeral 303 indicates a switching circuit; numeral 306 indicates a C-frame register; numeral 307 indicates a comparator; numeral 308 indicates an H counter which is reset by HD and adapted to count clocks; numeral 309 indicates V counter which is reset by VD and adapted to count clocks; and numeral 310 indicates a decoder for generating a predetermined frame signal.

First, a signal corresponding to the scanning position of the image sensing signal in the image plane is generated by the H counter 308 and the V counter 309, and this signal is compared by the comparator 307 with C-frame data previously written to the C-frame register from the MPU interface circuit 126 by an AE-frame-C-register writing pulse, thereby generating a frame signal SG2. At the same time, the output of the H counter 308 and that of the V counter 309 are input to the decoder 310 to form a predetermined frame signal SG3.

The input luminance signal Yc is first gated by the gate circuit 301 in accordance with the gate signal SG2 of a movable frame, and is integrated by the integrator 302. At this time, an AE reset signal C is generated by the MPU interface circuit 126, for example, during the vertical blanking interval, thereby resetting the integrator 302. When an AE read-out signal C is generated by the MPU interface circuit 126 at the beginning of the next vertical blanking interval, data which has been integrated by the integrator 302 is output to the internal bus 213.

Further, the luminance signal Yc is switched by the switching circuit 303 in accordance with the gate signal SG3 of a predetermined frame, and is integrated by the integrator 304 or 305.

At this time, as in the above-described case, the resetting of the integrators 304 and 305 and data output are effected in accordance with the AE reset signals A and B and the AE read-out signals A and B.

Figure 6:
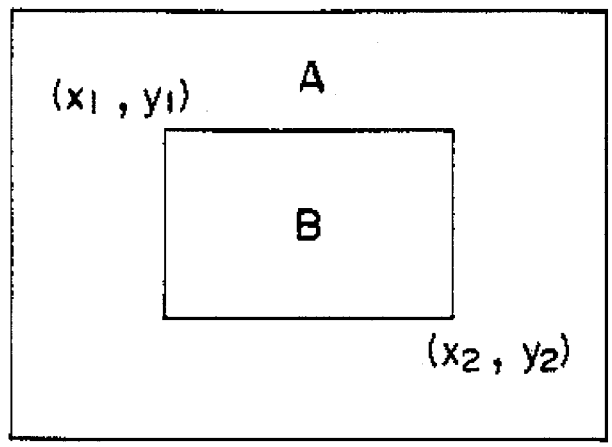
FIG. 6 is a diagram illustrating a centralized AE photometric distribution in FIG. 5.
Figure 7:
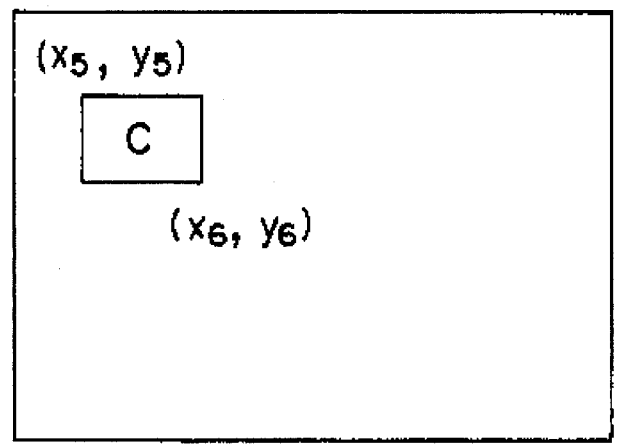
FIG. 7 is a diagram illustrating a counter-light measurement frame in FIG. 5.

FIGS. 6 and 7 are diagrams illustrating the operation of the circuit shown in FIG. 5. In the drawings, the outer frame represents the image plane. In FIG. 6, the portion on the outside of the frame represented by predetermined coordinate values (X1, Y1) and (X2, Y2) is referred to as area A, and the portion on the inside of the same is referred to as area B, the luminance signals in these areas being respectively input to the integrators 304 and 305 shown in FIG. 5. When coordinate values (x5, y5) and (x6, y6) are written to the C-frame register 306, a C-frame as shown in FIG. 7 is obtained, and the luminance signal on the inside of the frame is input to the integrator 302 shown in FIG. 5.

The output of the integrators 302, 304 and 305 thus read out are used in AE control in accordance with the algorithm shown in FIGS. 14 to 17 described below. The pattern of the AE frame is not restricted to the above described; the position, number, combination, etc. thereof may be changed as needed.

Figure 8:
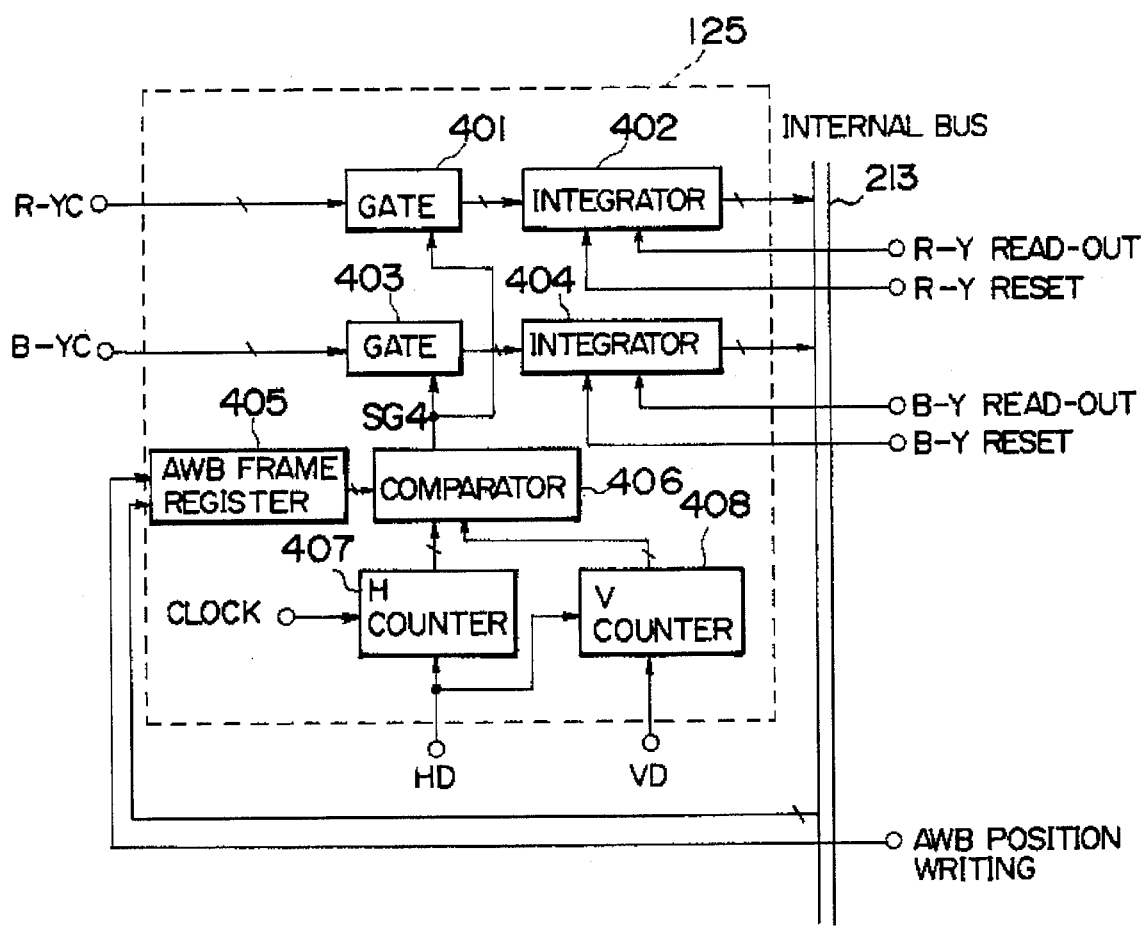
FIG. 8 is a detailed view of an AWB pre-process in the embodiment of FIG. 1.

FIG. 8 shows in detail the AWB preprocess circuit 125 of FIG. 1. Numerals 401 and 403 indicate gate circuits for setting an AWB frame; numerals 402 and 404 indicate integrators; numeral 405 indicate an AWB frame register; numeral 406 indicates a comparator; numeral 407 indicates an H counter which is reset by HD and adapted to count clocks; and numeral 408 indicates a V counter which is reset by VD and adapted to count HD.

First, the H counter 407 and the V counter 408 generate signals corresponding to the scanning position of the image sensing signal in the image plane, and these signals are compared by the comparator 406 with AWB-frame data written to the AWB frame register 405 from the MPU interface circuit 126 in accordance with AWB-frame-register writing pulses., thereby generating a gate signal SG4.

The input color difference signals R-Y and B-Y are first gated by the gate circuits 401 and 403 in accordance with the AWB frame gate signal SG4, and are integrated by the integrators 402 and 404. During, for example, the vertical blanking interval, R-Y reset signal and B-Y reset signal are generated by the MPU interface circuit 126, and the integrators 402 and 404 are reset. At the beginning of the next blanking interval, R-Y read-out signal and B-Y read-out signal are generated, and integrated data is output to the internal bus 213.

Figure 9:
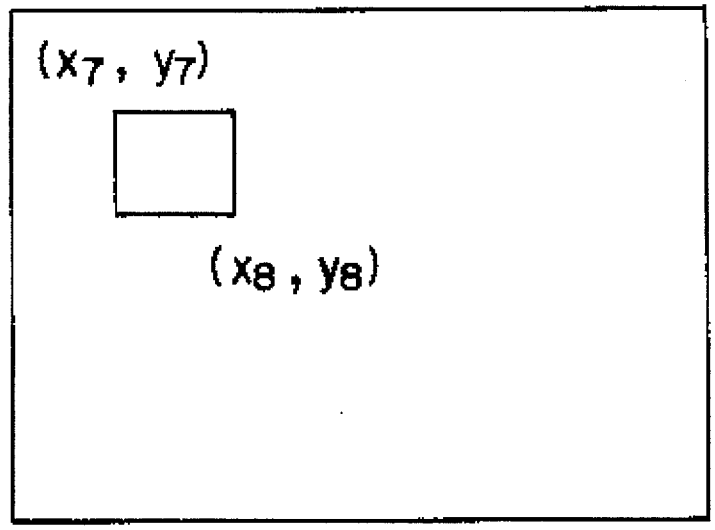
FIG. 9 is a diagram illustrating an AWB frame in FIG. 8.

FIG. 9 illustrates the operation of the circuit shown in FIG. 8. The outer frame portion represents the image plane. When coordinates (x7, y7) and (x8, y8) are written to the AWB frame register 405, an AWB frame as shown in the drawing is obtained, and the color difference signals on the inside of this frame are input to the integrators 402 and 404 of FIG. 8.

The output of these integrators 402 and 404 is used in AWB control in accordance with the algorithm shown in FIGS. 18 to 20 described below.

Figure 10:
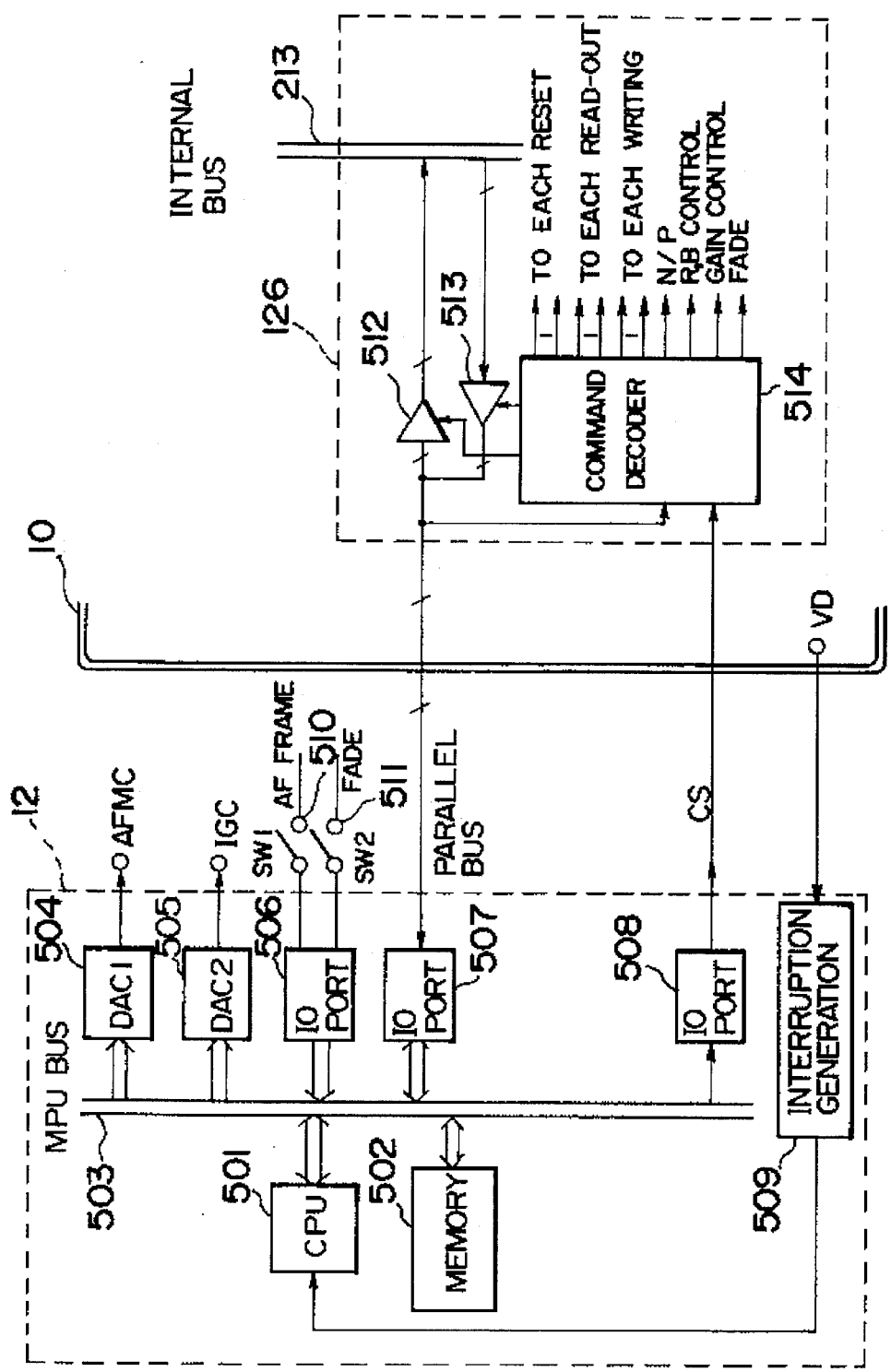
FIG. 10 is a detailed view of an MPU interface in the embodiment of FIG. 1.

FIG. 10 shows in detail the MPU circuit 12 and the MPU interface circuit 126 of FIG. 1. The components indicated by numerals 501 to 509 are provided inside the MPU circuit 12. Numeral 501 indicates a CPU circuit; numeral 502 indicates a memory for holding predetermined programs and data; numeral 503 indicates an internal bus of the MPU circuit; numerals 504 and 505 indicate DA converters; numerals 506, 507 and 508 indicate I/O ports; and numeral 509 indicates an interruption generating section. Numerals 510 and 511 indicate switches connected to the I/O port 506 of the MPU circuit 12; numerals 512 and 513 indicate bus buffers adapted to operate in accordance with control signals; and numeral 514 indicates a command decoder adapted to interpret input commands and generate signals for controlling the different sections inside the integrated circuit 10.

In accordance with the program of the memory 502, the CPU 501 reads the conditions of the switches SW1 and SW2 connected to the IO port 506, inputs and outputs data and commands to the MPU interface circuit 126 through IO ports 507 and 508, and generates an AF motor control voltage AFMC and an IG control voltage IGC through the DA converters 504 and 505. Further, when the vertical synchronization signal VD is input, the interruption generating section 509 generates in the CPU 501 an interruption signal, whereby the CPU performs processing at the time of interruption.

The switch SW1 is a switch for setting the size of the AF frame. By manipulating this switch, the operator can select either of the AF frames having different sizes shown in FIGS. 3 and 4. Further, it is also possible to employ an arrangement in which still other patterns can be selected.

The switch SW2 is a switch for performing a fading operation. By depressing this switch, the operator can effect fade-out or fade-in of an image. The command decoder 514 receives a command from the IO port 507 in accordance with a chip select signal CS generated at the IO port 508, and interprets the command. When it is a write command, the bus buffer 512 is operated and, at the same time, a corresponding write pulse is generated. When it is a read-out command, the bus buffer 513 is operated and, at the same time, a corresponding read-out pulse is generated.

Further, in accordance with a reset command, setting commands for different sections, etc., a reset pulse, an NTSC/PAL switching pulse, a fade signal, etc. are generated.

FIGS. 11 to 19 are flowcharts illustrating the operation of the MPU circuit 12 shown in FIG. 10.

Figure 11:
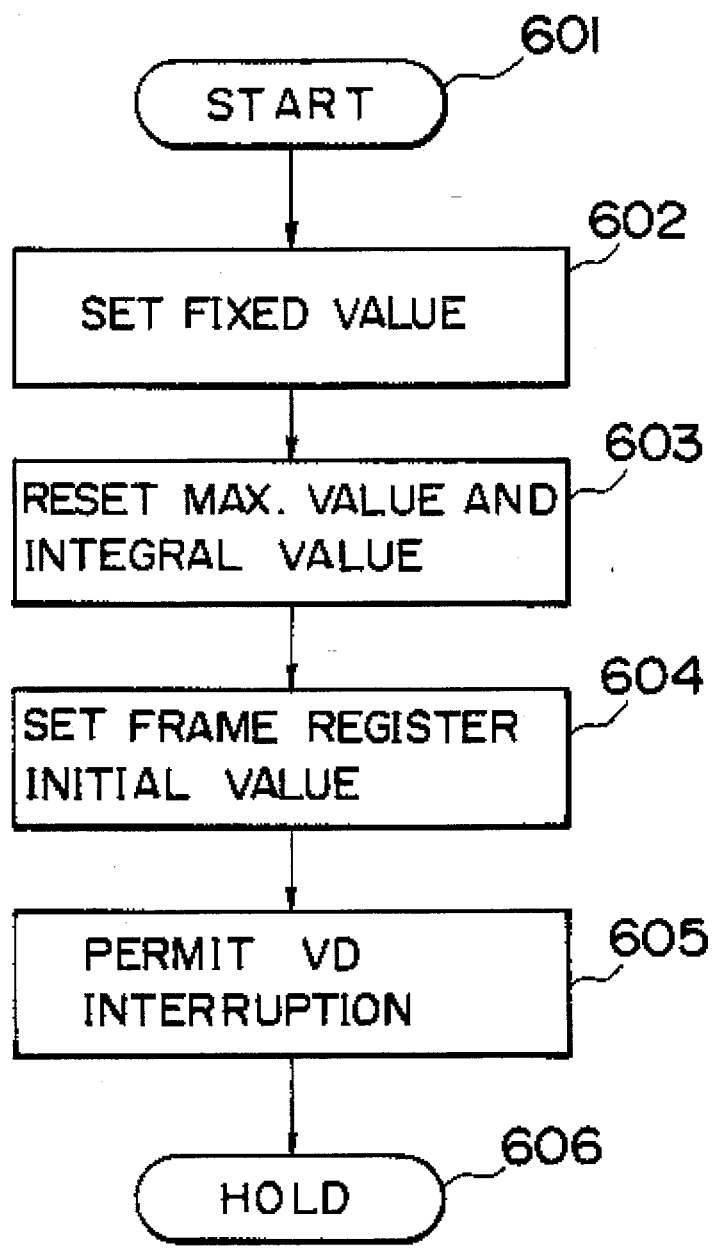

FIG. 11 shows the operation when power is turned on. The operation is started in step 601, and, in step 602, the NTSC/PAL switching is set, and the fixed values in the integrated circuit, such as the initial gain values, etc. are set through the MPU interface circuit 126. In step 603, the maximum value or integral value of each of the preprocess circuits for AF, AE and AWB is reset, and, in step 604, the initial value of each frame register is set. In step 605, interruption by the vertical synchronization signal VD is permitted, and, in step 606, the circuit goes into hold state. Afterwards, the operation is performed in accordance with the interruption due to VD.

Figure 12:
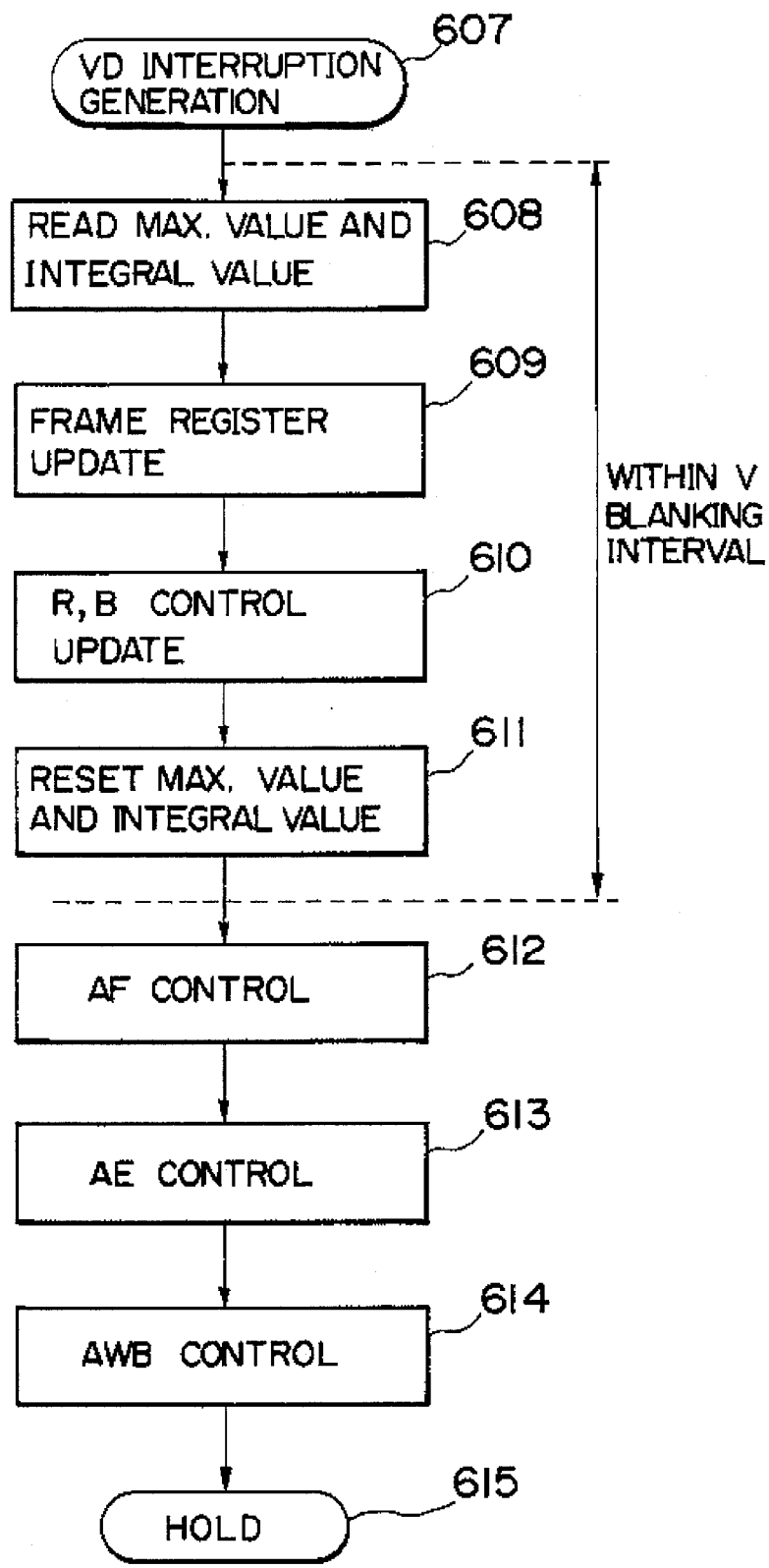
FIG. 12 is a diagram illustrating the operation when an interrupt due to VD has occurred in the MPU operation flowchart of the embodiment of FIG. 10.

FIG. 12 shows the operation at the time of VD interruption. When, in step 607, VD interruption is generated, the maximum value and integral value of each of the preprocess circuits for AF, AE and AWB are read, and, in step 609, the value of each of the frame registers for AF, AE and AWB is updated. In step 610, the R and B gain control values are updated and, in step 611, the maximum value and integral value of each of them are reset. The operations of steps 608 to 611 are completed within the vertical blanking interval. In steps 612 to 614, AF control, AE control and AWB control are performed and, in step 615, the circuit goes into hold state again to await VD interruption. The operations of steps 607 to 615 are completed within one vertical blanking interval (16 ms to 20 ms).

FIG. 13 illustrates in detail the AF control in step 612 of FIG. 12. First, the control is started in step 616 and, in step 617, the maximum value EV of the read high-frequency component in the vertical direction is compared with the maximum value EH of the high-frequency component in the horizontal direction. When EH is larger than EV, the AF operation is performed by using the high-frequency component in the horizontal direction. For this purpose, EH is substituted for the current value of the high-frequency component, Enow, in step 618. When, in step 617, EV is larger than EH, EV is substituted for Enow so as to use the high-frequency component in the vertical direction.

In step 620, the change in the high-frequency component, Ed, is obtained by subtracting the previous high-frequency component Eold from the current high-frequency component Enow. Further, Enow is substituted for Eold. In step 621, Ed is compared with predetermined threshold values Eth and −Eth. When Ed is smaller than −Eth, it is to be assumed that the high-frequency component has been reduced, i.e., the focus point has moved in the opposite direction, due to the rotation of the AF motor, or that the focus point has been displaced despite the motor remaining still. Accordingly, a judgment is made in step 622 as to whether the AF motor control voltage is 0 or not. When it is 0, a predetermined value SAF is substituted for AFMC in step 624 so as to turn the AF motor. When AFMC is not 0 in step 622, the polarity of AFMC is inverted so as to move the focus point in the opposite direction.

When, in step 621, Ed is larger than −Eth and smaller than Eth, it is to be assumed that the image sensing apparatus is in focus, so that in step 625, AFMC is reduced to 0 to stop the AF motor. When, in step 621, Ed is larger than Eth, focus control is in the right direction, so that AFMC is left as it is.

In step 626, the AFMC voltage set in the manner described above is output from the DA converter 504 inside the MPU 12. In step 627, the condition of the switch SW1 of FIG. 10 is checked. If the switch is in the OFF position, the frame size is set large, as shown in FIG. 3, in step 628 and, when the switch is in the ON position, the frame size is set small, as shown in FIG. 4, in step 629, the AF control being terminated in step 630 to proceed to AE control.

Figure 14:
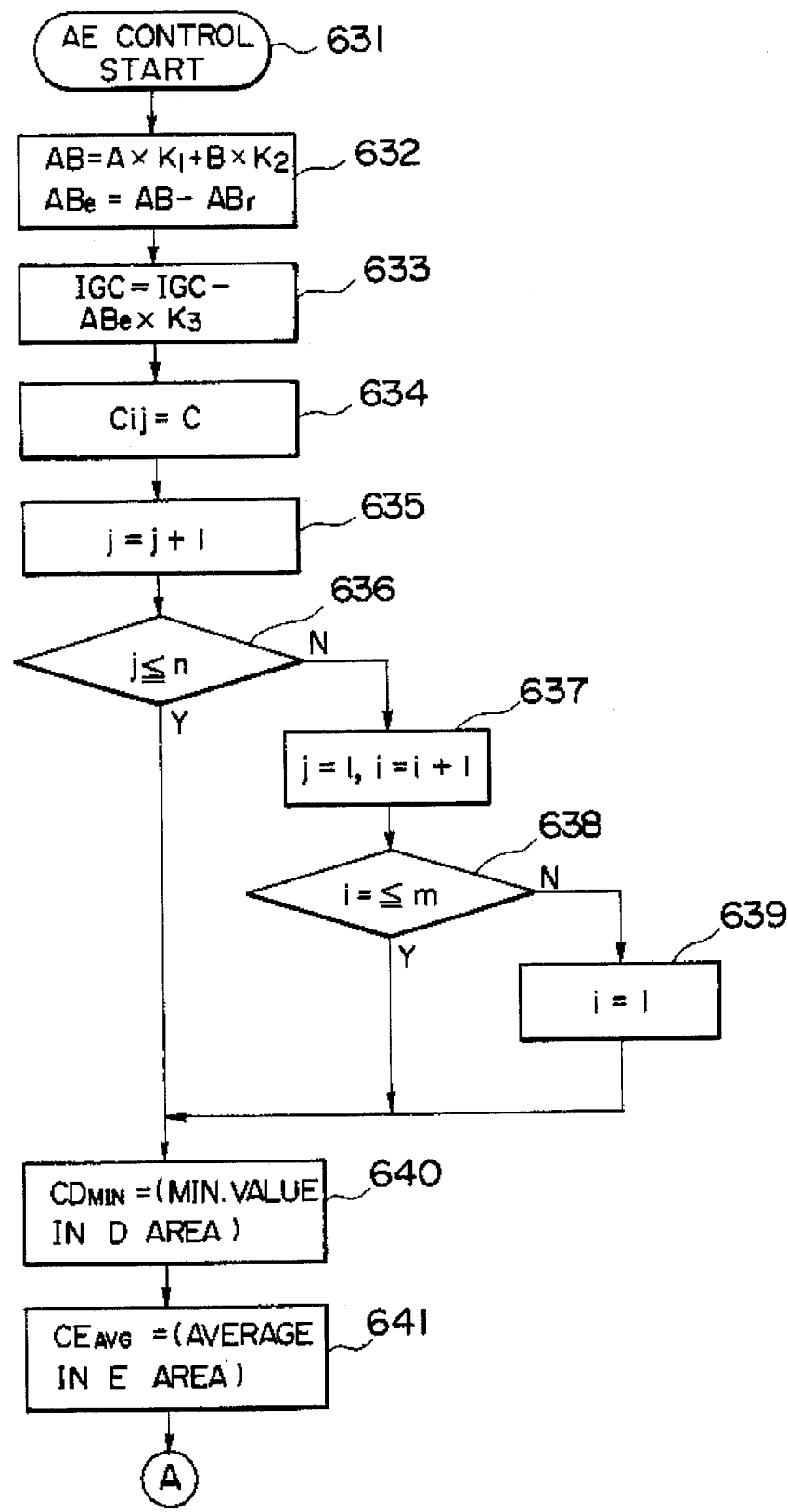
FIG. 14 is a diagram illustrating an operation of AE control in step 613 of the operation flowchart of FIG. 12.
Figure 15:
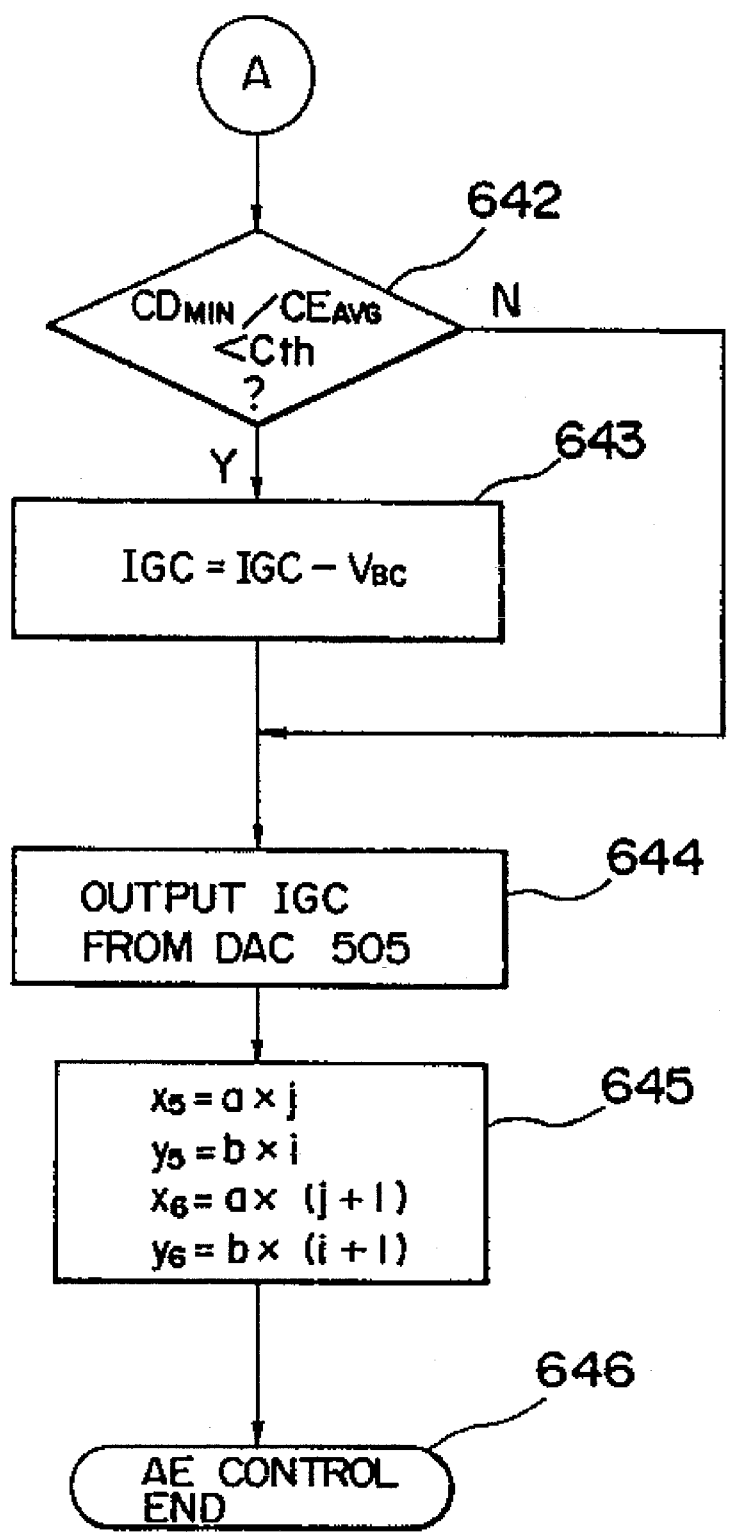
FIG. 15 is an operation diagram illustrating a continuation of the operation flowchart of FIG. 14.

FIG. 14 is a flowchart illustrating in detail the AE control in step 613 of FIG. 12. The control starts in step 631, and, in step 632, a weighted average AB of the areas A and B in FIG. 6 is obtained. That is, the integral value A of the area A obtained as the output of the integrator 304 of FIG. 5 is multiplied by a weight K1, and the integral value B of the area B obtained as the output of the integrator 305 of FIG. 5 is multiplied by a weight K2. By adding up the two integral values, a weighted average AB is obtained. Further, the difference between this value and a reference value ABr is obtained as ABe.

In step 633, the value of ABe is multiplied by a predetermined coefficient K3, and the value thus obtained is subtracted from the current IG drive voltage IGC, thereby obtaining the next IG drive voltage IGC.

In step 634, the integral signal C read from the integrator 302 of FIG. 5 is substituted for data Cij on the current position of the C-frame, and, in step 635, j is incremented by 1. In step 636, j is compared with a predetermined number of division in the horizontal direction, n. If j is smaller than or equal to n, the procedure advances to step 640; if it is greater than n, j is set to 1 in step 637, and i is incremented by 1.

Further, in step 638, i is compared with a predetermined number of division in the vertical direction, m. If i is smaller than or equal to m, i is left as it is, and, when it is greater than m, i is set to 1 in step 639. Then, in step 640, the minimum value of C in the area D of FIG. 16, CDmin, is obtained, and, in step 641, the average of C in the area E of FIG. 16, CEavg, is obtained. In step 642 of FIG. 15, the ratio of CDmin to CEavg is compared with a predetermined threshold value Cth. When it is equal to or greater than Cth, the procedure advances to step 644; when it is smaller than Cth, the luminance of the background is rather high with respect to the subject, that is, the image sensing apparatus is in the so-called backlight state, so that, in step 643, a predetermined exposure correction value VBC is subtracted from IGC.

In step 604 of FIG. 11, the frame has been reset to C11, so that the frame C is sequentially switched field by field after power is turned on, with CDmin and CEavg changing each time such switching is effected.

In step 644, IGC is output from the DA converter 505. In step 645, x5, y5, x6 and y6 are obtained from the vertical and horizontal frame sizes a and b and the horizontal and vertical frame positions j and i so as to obtain the next position of the C-frame, and the AE control is terminated in step 646. FIG. 17 illustrates an AE control operation. In the drawing, the outer frame represents the image plane, which is divided into n sections in the horizontal direction and m sections in the vertical direction, the current position of the C-frame in the image plane being indicated by i and j. The AE control operation is terminated in step 646, and the procedure advances to AWB control.

Figure 18:
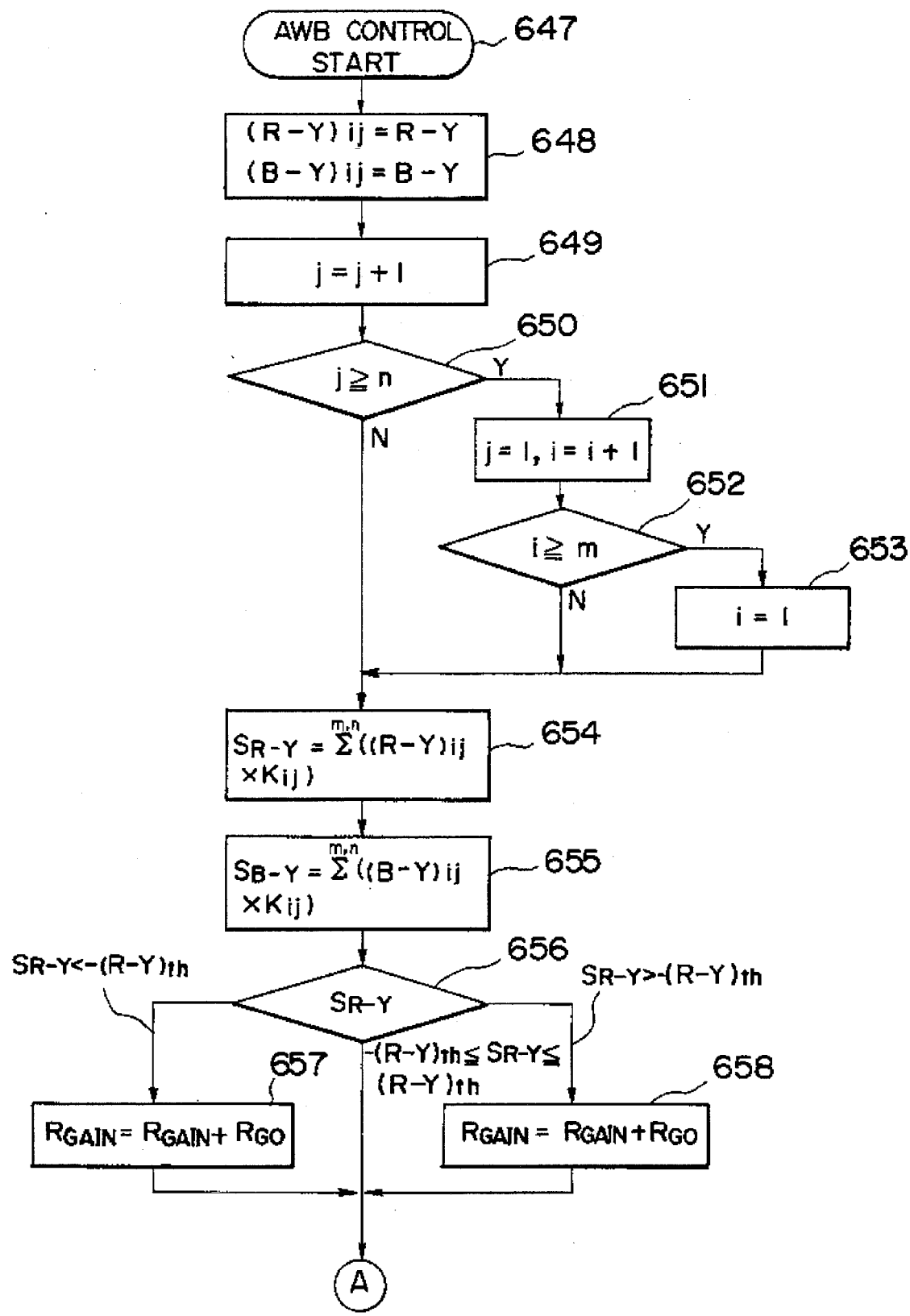
FIG. 18 is an operation diagram illustrating an AWB control in step 614 of the operation flowchart of FIG. 12.
Figure 19:
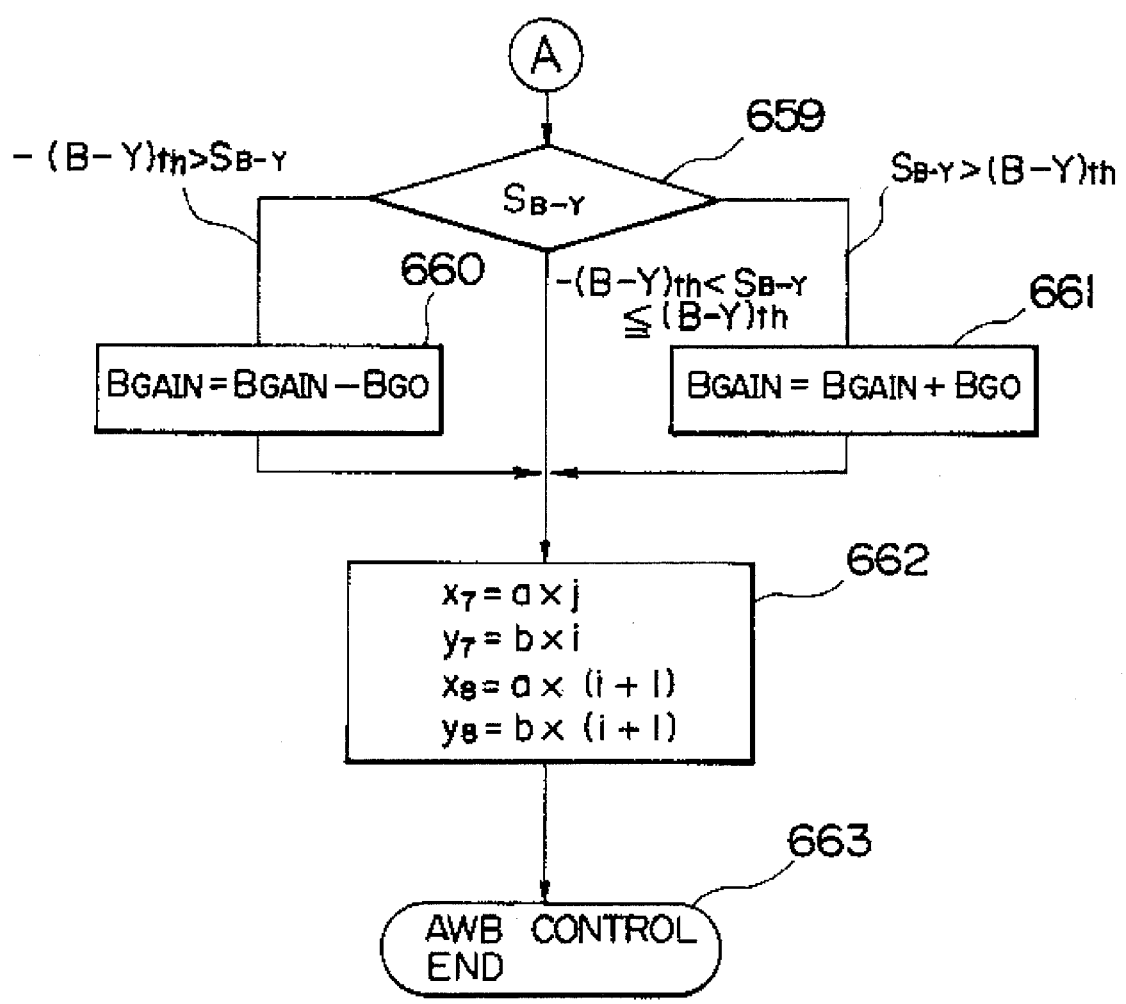
FIG. 19 is an operation diagram showing a continuation of the operation flowchart of FIG. 18.

FIG. 18 is a detailed flowchart of the AWB control step in FIG. 12. The AWB control is started in step 647, and, in step 648, the read data R-Y and B-Y is substituted for the color difference data on the current position of the AWB frame, (R−Y)ij and (B−Y)ij. In step 649, j is incremented by 1, and, in step 650, j is compared with the number of division in the horizontal direction of the AWB frame, n. When j is smaller than or equal to n, it is left as it is, and, if it is larger than n, j is set to 1 in step 651, and i is incremented by 1. In step 652, i is compared with the number of division in the vertical direction of the AWB frame, m. When i is smaller than or equal to m, it is left as it is, and, if it is larger than m, i is set to 1 in step 653.

As in the case of the AE frame, the AWB frame is reset to the upper left corner of the image plane. Afterwards, it is shifted field by field.

In step 654, the weighting total SR-Y of (R−Y)ij is obtained, and, in step 655, the weighting total SB-Y of (B−Y)ij is obtained. If, in step 656, SR-Y is smaller than a predetermined threshold value −(R−Y)th, a predetermined value RGO is subtracted from the R gain control value RGAIN, in step 657. If, in step 656, SR-Y is greater than or equal to −(R−Y)th and smaller than or equal to (R−Y)th, the value is left as it is, and, if SR-Y is greater than (R−Y)th, the predetermined value RGO is added to RGAIN in step 658. Likewise, if, in step 659 of FIG. 19, SB-Y is smaller than a predetermined threshold value −(B−Y)th, a predetermined value BGO is subtracted from the B gain control value RGAIN, in step 660.

If, in step 659, SB-Y is greater than or equal to −(B−Y)th and smaller than or equal to (B−Y)th, the value is left as it is, and, if SB-Y is greater than (B−Y)th, the predetermined value BGO is added to BGAIN in step 661. In step 662, x7, y7, x8 and y8 are obtained from the vertical and horizontal frame sizes a and b and the horizontal and vertical frame positions j and i so as to obtain the next position of the AWB frame, and the AE control operation is terminated in step 663. The values of n, m, a and b in FIG. 18 may be the same as or different from those in FIG. 14. FIG. 20 illustrates an AWB frame. In the drawing, the outer frame represents the image plane, which is divided into n sections in the horizontal direction and m sections in the vertical direction, the current position of the AWB frame in the screen being indicated by i and j.

As described above, the present invention provides an image sensing apparatus comprising: signal processing means for processing image sensing signals; a plurality of adjustment signal generating means for generating mutually different signals for automatic adjustment by using part of the signals of the signal processing means; interface means for inputting the output of the plurality of adjustment signal generating means and outputting it through a common signal path; and control means for adjusting a plurality of adjusting sections of the image sensing apparatus by using the output of the adjustment signal generating means. Due to this construction, it is only necessary for the microprocessor to receive processed data when performing automatic focusing, automatic exposure adjustment, automatic white balance adjustment or the like. Accordingly, it is possible to adopt an inexpensive microprocessor having relatively limited processing capability. Further, since the processing operation can be terminated within the vertical interval, the control speed can be increased. Furthermore, in the case where an integrated-circuit construction is adopted, the number of circuits for connection with the microprocessor is small, so that the mounting area can be made very small, thereby making it possible to realize the image sensing apparatus in a small size. Further, since no high-speed data is taken out of the integrated circuit, it is possible to minimize the radiation noise, the power noise due to capacity load and the like, thereby contributing to improvement in sensitivity.

What is claimed is:

1. An image sensing apparatus comprising:

signal processing means for processing image sensing signals;

data processing means, including a plurality of adjustment signal generating means for generating mutually different output signals for automatic adjustment by using a part of signals of said signal processing means;

an interface circuit for controlling output and input processing of data from and to said data processing means to convert the generated output signals into a predetermined format to output the converted output signals through a common signal path; and control means for adjusting a plurality of adjusting sections of said image sensing apparatus by using the converted output signals outputted through said common signal path by said interface means, wherein said signal processing means and said data processing means are integrated in the same integrated circuit.

2. An image sensing apparatus according to claim 1, wherein said adjustment signal generating means generates signals for automatic focusing.

3. An image sensing apparatus according to claim 1, wherein said adjustment signal generating means generates signals for automatic exposure adjustment.

4. An image sensing apparatus according to claim 1, wherein said adjustment signal generating means generates signals for automatic white balance adjustment.

5. An image sensing apparatus comprising:

signal processing means for processing image sensing signals;

data processing means, including a plurality of adjustment signal generating means for generating mutually different output signals for automatic adjustment by using a part of the signals of said signal processing means;

an interface circuit for controlling output and input processing of data from and to said data processing means to convert the generated output signals into a predetermined format to output the converted output signals through a common signal path; and control means for performing adjustment in accordance with each of the converted output signals outputted through said common signal path by said interface means, wherein said signal processing means and said data processing means are integrated in the same integrated circuit.

6. An image sensing apparatus according to claim 5, wherein said adjustment signal generating means covers at least one of the following operations: automatic focusing, automatic iris adjustment and automatic white balance adjustment.

7. An image sensing apparatus according to claim 6, wherein said data processing means converts signals of said adjustment signal generating means to a common arithmetic-processing form.

8. An image sensing apparatus according to claim 7, wherein said automatic focusing, said automatic iris adjustment and said automatic white balance adjustment are executed serially.

9. A signal processing circuit for video cameras, comprising:

(A) an extraction circuit for extracting a plurality of control parameters from image sensing signals output from an image sensing means;

(B) data processing means including (i) data forming circuitry for forming predetermined data signals from said plurality of control parameters extracted by said extraction circuit, and (ii) an output circuit for controlling output and input processing of data from and to said data forming circuitry to convert data from said data forming circuitry into a predetermined format and outputting the converted data to a common bus, wherein said extraction circuit, said data forming circuitry, and said output circuit are integrated in one integrated circuit chip.

10. A signal processing circuit according to claim 9, further comprising a common arithmetic processing circuit for performing arithmetic processing serially on data output from said output circuit to generate control values corresponding to said control parameters.

11. A signal processing circuit according to claim 10, further comprising an adjustment circuit for adjusting an image sensing operation in accordance with output control values of said arithmetic processing circuit.

12. A signal processing circuit according to claim 11, wherein said adjustment circuit covers automatic focusing, automatic iris adjustment and automatic white balance adjustment.

13. A video signal processing device comprising:

(A) extraction means for extracting a plurality of predetermined signal components from a video signal to detect an image pickup state;

(B) decision means for deciding whether the image pickup state is appropriate, based on the plurality of signal components extracted by said extraction means, and for outputting a decision signal in accordance with said decision;

(C) adjustment signal generation means for operating on data to produce an adjustment signal for adjustment of the image pickup state, based on the output of said decision means, and for outputting the adjustment signal; and (D) interface means, provided between said extraction means and said adjustment signal generation means, for converting the output of said extraction means into the data on which said adjustment signal generation means operates, wherein said extraction means and said interface means are integrated in a common integrated circuit.

14. A device according to claim 13, wherein said data processing means supplies the data to said adjustment signal generation means within a vertical interval of said video signal.

15. A device according to claim 14, wherein said adjustment signal generation means terminates operations on the data within a vertical interval based on output signals supplied from said data processing means.

16. A device according to claim 13, wherein said plurality of signal components are for performing automatic focusing, automatic iris adjustment and automatic white balance adjustment.

17. A device according to claim 13, wherein said interface means supplies the data to said adjustment signal generation means by means of a common bus.

* * * * *